(12) United States Patent
Evans

(10) Patent No.: US 9,406,343 B1
(45) Date of Patent: Aug. 2, 2016

(54) METHOD OF TRACKING FOR ANIMATION INSERTIONS TO VIDEO RECORDINGS

(71) Applicant: Bryan T. Evans, Jersey City, NJ (US)

(72) Inventor: Bryan T. Evans, Jersey City, NJ (US)

( * ) Notice: Subject to any disclaimer, the term of this patent is extended or adjusted under 35 U.S.C. 154(b) by 0 days.

(21) Appl. No.: 14/605,927

(22) Filed: Jan. 26, 2015

(51) Int. Cl.
| | |
|---|---|
| G11B 27/34 | (2006.01) |
| G11B 27/11 | (2006.01) |
| G11B 27/036 | (2006.01) |
| H04N 5/272 | (2006.01) |
| G06T 13/20 | (2011.01) |
| G06T 13/80 | (2011.01) |

(52) U.S. Cl.
CPC ............ *G11B 27/34* (2013.01); *G06T 13/20* (2013.01); *G06T 13/80* (2013.01); *G11B 27/036* (2013.01); *G11B 27/11* (2013.01); *H04N 5/272* (2013.01)

(58) Field of Classification Search
None
See application file for complete search history.

(56) References Cited

U.S. PATENT DOCUMENTS

| | | | | |
|---|---|---|---|---|
| 2009/0046152 | A1* | 2/2009 | Aman | A63B 24/0021 348/157 |
| 2010/0289896 | A1* | 11/2010 | Kong | H04N 21/43637 348/143 |
| 2011/0222757 | A1* | 9/2011 | Yeatman, Jr. | G06T 7/0075 382/154 |

* cited by examiner

*Primary Examiner* — Eileen Adams
(74) *Attorney, Agent, or Firm* — Hulsey Hunt & Parks P.C.

(57) ABSTRACT

A method of capturing specific locations on a movie set with unseen markers that transfer information to the film recorder consistently and continuously during a shoot is provided. Such markers are provided in strategic locations as the bases for introductions of 3D animations in post-processing with continuous transmission of signals indicating such locations to a receiver mounted on and integrated within a camera (that also continuously sends location and movement signals for complete recordation of the film set during filming). In such a manner, the tracking devices do not have to be processed from the resultant film and the need for multiple shots of the same set is avoided. The film method, as well as a movie set utilizing such markers for such a purpose in conjunction with a properly outfitted camera, are encompassed within the overall invention.

12 Claims, 5 Drawing Sheets

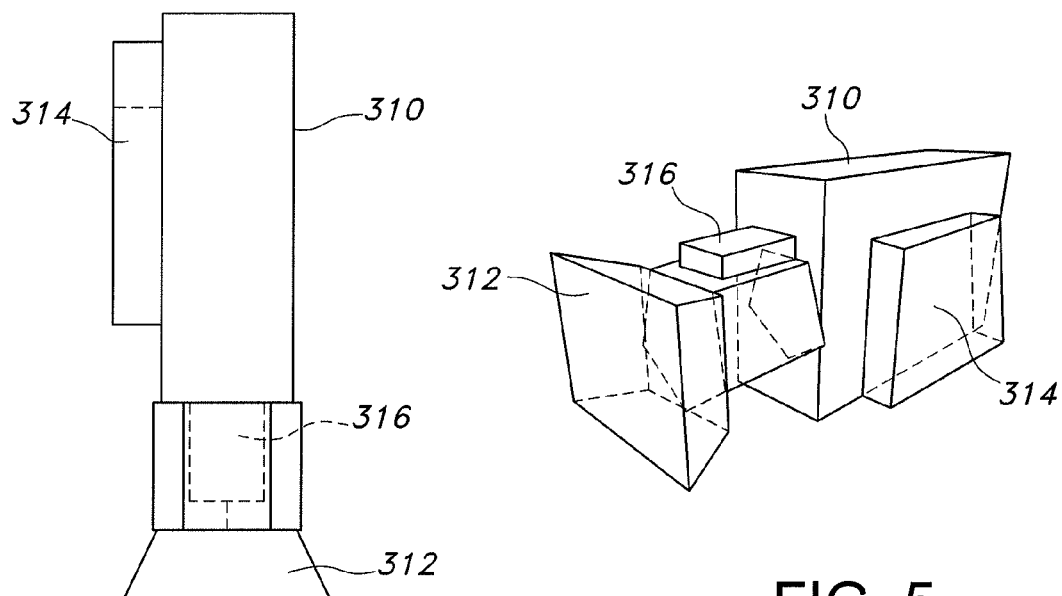
FIG. 4
FIG. 5
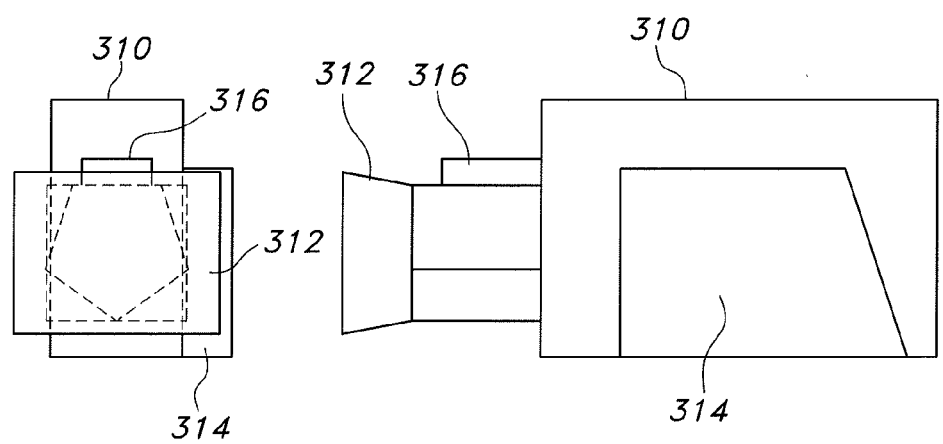
FIG. 7
FIG. 6

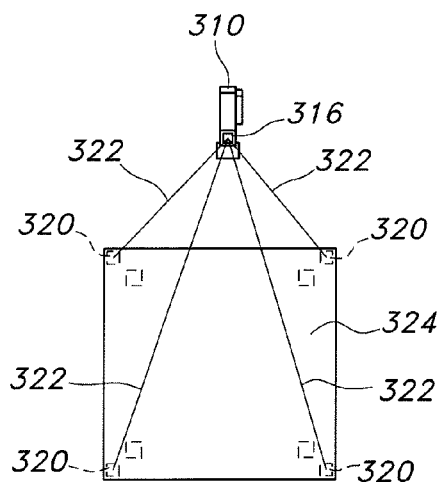
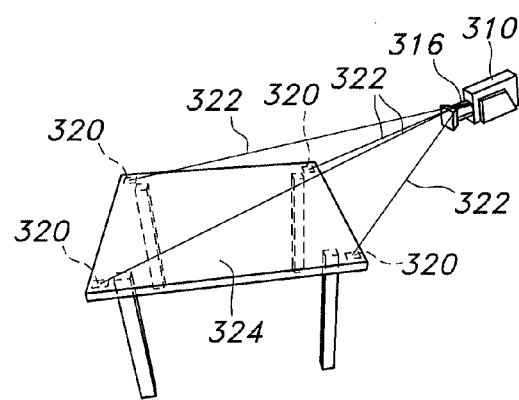
FIG. 8 FIG. 9
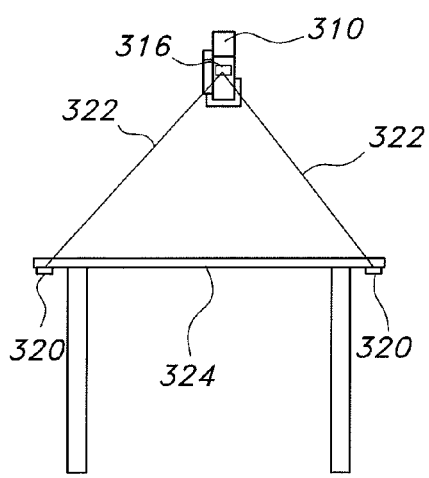
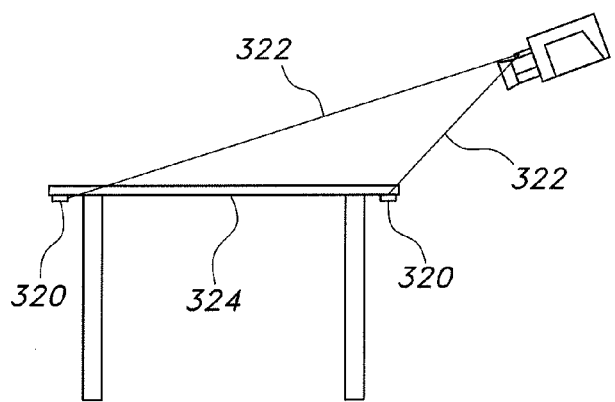
FIG. 10 FIG. 11

METHOD OF TRACKING FOR ANIMATION INSERTIONS TO VIDEO RECORDINGS

FIELD OF THE INVENTION

The present invention pertains to a method of capturing specific locations on a movie set with unseen markers that transfer information to the film recorder consistently and continuously during a shoot. Such markers are provided in strategic locations as the bases for introductions of 3D animations in post-processing with continuous transmission of signals indicating such locations to a receiver mounted on and integrated within a camera (that also continuously sends location and movement signals for complete recordation of the film set during filming). In such a manner, the tracking devices do not have to be processed from the resultant film and the need for multiple shots of the same set is avoided. The film method, as well as a movie set utilizing such markers for such a purpose in conjunction with a properly outfitted camera, are encompassed within the overall invention.

BACKGROUND OF THE PRIOR ART

Live-action films have long involved the addition of animated portions that react with actors on-screen or provide other desirable effects. Generally, such effects were undertaken through the utilization of long-abandoned activities such as a stand-in (that is then covered up by the animation itself), a blue screen (that allows for larger backgrounds, etc., to include an animated, or other similar, result as an overlay for the subject scene), and most recently electronic markers that are attached to objects or even people that send signals to the camera indicating specific locations and movement. In each situation, however, post-production actions are needed to not only add the desired effects (animation, three-dimensional, computer graphics, or CGI, all as examples) within the specific set places within the film. Such instances require significant investment in time and resources to pinpoint such specific locations as well as "scrub" the markers, etc., from view in order to accord a suitable end picture for viewer consumption. Without such needed marker, etc., removal, the picture would include unsightly items of this sort which would most certainly impact the overall aesthetics involved. Additionally, with electronic monitoring (markers, again, for example), it is sometimes necessary to continuously film scenes at set angles, or even provide different viewpoints with multiple recordings in order to ensure the overall view of the filmed set and objects thereon are consistent for each shot. The markers, then, may be in multiple shots, requiring, again, rather involved "removal" in post-production. Alternatively, though, the necessity for such multiple shot may only involve a single filming of the markers involved; the problem in that situation is that the parallax views of the camera(s) require such multiple recordings to ensure the added animation, etc., is placed properly. Basically, the capability of the markers themselves to provide anything beyond single shot perspectives of the animation, etc., insert locations in a film drastically limit's the overall capacity of the system to provide an efficient film recording result. The electronic signal markers, in other words, are generally provided as object capture devices, rather than definitive location sensors. Because they must be provided as viewable structures (even if small in size) for the subject camera, no further capabilities for, for instance, exact location measurements, at least beyond those involving actual sighting by the eye (and in this case, the camera), have been considered. Thus, as noted above, it has become acceptable and customary to have such markers "scrubbed" at the post-production (or, at least during pre-CGI, animation, etc., insertion) step and, again, to undertake multiple, and possibly cumbersome multiple shots of the same scene to ensure location specifics are in place for such CGI, etc., insertion purposes. Thus, there remains a significant need to provide and continuous, seamless, and consistent manner of introducing CGI, 3D animation, etc, into video recordings (such as films, and the like) without the need for viewable filmed markers and, additionally, in some manner the ability to reduce or even eliminate the need for multiple shots of the same scene to align the subject camera angles and parallax views.

The closest prior art in this respect concerns, again, the utilization of certain electronic signal transmitters (markers) that are placed in plain view for camera recording during a film shoot. Such cameras thus not only record the filmed objects prior to insertion of CGI, animation, and the like, but the markers provide the necessary indications as to placement and introduction of such CGI, animation, and the like. These markers transmit signals as indicators for such a purpose, but, typically, these signals are not provided directly to the camera operator and are relayed for limited purposes. In other words, such devices, being, as alluded to above, viewable to the camera operator during filming, concern the correlation between movement of either an actor representing a CGI (or like) character, or provide readings for stationary objects while the camera moves. Actual static locations of objects and/or locations for CGI, animation, etc., effects additions to a scene are not provided in any other way than such viewable structures. Thus, in order to ensure such effects are inserted properly and suitably within the picture itself, again, as noted above, post-production (or like) activities are needed to ensure such markers are removed from any sight lines and still provide the necessary location indications. These limited activities thus show a clear lack of efficiency in this respect. Placement of markers on individuals that serve as stand-ins for CGI characters, then, is the closest to definitive location indications any such sensors accord the industry at this time. However, in that situation, it is also evident that the resultant CGI character "covers up" all of the viewable markers and thus does not pose any actual problem, except the potential for extensive post-production activities that, ostensibly, would be in utilization anyway in such a situation.

As it is, there simply is lacking a proper manner of streamlining the film process for live-action video incorporating animation (whether typical hand-drawn or CGI types, and also including three-dimensional add-ins, as well) such that not only definitive location indications are provided for certain scenes for animation insertion, but also to drastically reduce the number of shots necessary to ensure proper locations in relation to the camera itself are provided for overall aesthetic effects. The present invention proposes to overcome these prior deficiencies with the resultant desired benefits noted previously.

SUMMARY AND ADVANTAGES OF THE INVENTION

One noticeable advantage of this inventive system is the ability to utilize signal transmitter devices that communicate with at least one receiver mounted and integrated with at least one film camera from hidden locations thus eliminating the need for removal from a resultant picture. Another advantage is the capability of such a system to permit such signal transmissions to indicate exact locations for animation inserts from a single film undertaking on a continuous basis. Yet another advantage of this inventive system is the ability to utilize any number of different devices that provide such transmission capabilities depending upon the conditions at the film shoot itself. Still another advantage is the further ability of the hidden transmission devices to constantly and consistently provide location information and indications as needed for such a purpose as well as to provide a suitable outline for CGI and/or other animation insertions on demand and in specific locations within the resultant film.

Accordingly, this invention encompasses a method of filming a live-action video scene on a film set with a recording camera including a signal transmitter and receiver mounted thereon, wherein such filming is for a film including inserted animation combined therewith said live-action, said method including placement of at least one signal transmission device as a marker on said film set for said inserted animation, wherein said placement of said at least one device is provided at a location on said film set that is hidden from camera view for the entirety of filming said scene; activating said at least one device to continuously transmit information of its specific location on said film set to said camera during said filming of said scene; activating said signal transmitter and receiver attached to said recording camera to continuously receive said transmitted information from said at least one set located signal transmission device while filming occurs and also activating said camera mounted signal transmitter and receiver to continuously transmit signals of the activity and movement of said camera to said at least one set located signal transmission device, thereby utilizing said specific location information from said at least one device and said camera mounted signal transmitter and receiver to provide real-time capability for insertion said animation within said film in relation to such specific monitored transmission signals and camera activity and movement. Such methods that permit a single film shot of said scene without any need for alignment or other type of hidden device location actions are thus also encompassed within this invention. Furthermore, such an invention also includes the utilization of signal transmission devices selected from the group consisting of an RFID device, and infrared device, a global positioning system device, an internal room positioning device, and any combinations thereof (with RFID devices potentially preferred), as well as for the insertion of animation items selected from the group consisting of hand-drawn animation, computer graphic animation, three-dimensional animation, and any combinations thereof. The ability to provide such continuous location data transmissions from such markers may be supplemented with other information generated through, as examples, accelerometers, barometric sensors, gyroscopes, altimeters, Bluetooth devices, and the like, as well.

The term "live-action video recording" or other like description is intended to denote that the film process includes, primarily, shots of live sets, objects, and/or people (actors). Such video recording is undertaken by any number of different cameras that may be remotely controlled, manually operated, or a combination of both. These cameras are further outfitted with communication receivers for both visual intake as well as wireless reception from the hidden electronic signal transmitters described herein. Such receivers allow for reception of marker transmissions in, as noted above, a continuous fashion regardless of the presence or movement of objects or people between the camera and the placement of the markers themselves (as opposed to prior markers that are limited to operations that require direct access for continuous transmissions).

The film speed may be any typical value, and such cameras are outfitted with adjustments components to control light levels, motion detections, image resolutions, parallax measurements, and the like, as found within and on such standard video recording devices. The receiver components allow for synchronization with the film images once recorded, as well. In that manner, the electronic signals provided by the hidden transmitter devices constantly provide the camera operator and/or the finished film itself with metrics relating to transmitter device locations on the subject set. Being hidden from view, such transmitters, as noted above, thus must continuously provide the camera and/or operator with such values in order to ensure proper information is then transferred to the animation artists and editors for suitable insertion within the film at the specific locations indicated by the transmitters themselves. Thus, the constant transmission of such information must be undertaken and properly received in order to avoid any necessity for further shots and/or editing thereafter.

Such wireless communications between transmitter(s) and camera (or operator) are thus undertaken through standard protocols, implemented by and/or on a program or code that can be stored in a computer-readable (or electronically-readable) medium and that can be provided in a WAN environment. The overall wireless system may be implemented onto a server, as well, upon, after, and/or during filming using, as non-limiting examples, Apache web server, MySql on Linux, Oracle on Linux, Java servlets, Applets, HTML, JavaScript, Java, C#, and Microsoft's .NET. The connection itself must be secure to prevent outside interference as well as to best guarantee the measured location specifics are, in fact, correct. Deviations could cause skewed results thereby delaying completion of the finished product and requiring, potentially, reshooting with calibrated measurements for optimized effects. Any such server that may be utilized for this purpose in relation to the film camera, for instance, may reflect implementation on the Internet, an intranet, or an extranet. Any software platform may thus be employed to implement the underlying transmission and recordation system from the hidden electronic signal markers, such as JAVA, Linux, and the like, and the code itself may be written in any language, including, BASIC, COBOL, C+, C++, and the like.

The terms "hidden electronic signal transmission device," "set located transmission signal device" and the like are thus utilized herein to indicate a remote informational all-encompassing "machine" that is programmed to denote its location in relation to any number of set parameters on a film set and to send such information directly and continuously to a receiver mounted upon (and possibly integrated within) a subject film camera. Such a "machine" may be a sensor, a chip-derived microcomputer, even a small computerized device, that generates a location measurement as noted above. Basically, such a device is able to determine its location coordinates in any manner needed and thus is able to transmit such coordinates to a receiver for proper utilization thereof. Thus, for instance, a radio frequency identification device (RFID) may be employed that is calibrated to a specific location in relation to its surroundings. When implemented, the device may be placed in a hidden location on a film set in order to continuously and consistently indicate its presence through the radio frequency set for both transmission from and reception by a camera or other like device. In this manner, the director, etc., of the film may have such a device (or multiple devices) placed (by a team, for instance, given instructions as to the specific places for deposit of such tags) on the subject set. Once in place, the continuous update as to location of each placed RFID (in synchronization with the specific placement of anticipated animation inserts, again, as noted above) provides a constant and updated map of the set from such hidden monitors. The signal strengths from these devices may be attenuated, as well, to further enhance the actual location indications, particularly if the camera itself moves during filming. The signals themselves, being related to the surroundings of the set, thus allow for constant monitoring of the exact location for animation insertion.

Infrared monitoring from hidden generators of this type may be also be utilized to like effect and in a similar manner. In such a situation, however, the IR signals are received by a suitable analytical receiver in order to determine device placement and constant location for these purposes. If desired, the actual user(s) may implement a combination of RFID and IR sensors for this purpose, particularly if the set conditions may be in need of such a variety of devices for such a purpose (such as if the radio frequency for some areas of the set itself may interfere with other processes or an outside source may interfere with those being utilized at that moment and thus extra and different sensor types may be employed).

Two other monitoring electronic signal transmitting devices may include similar types that record positioning through different pathways. Global positioning satellite device (GPS devices), for instance, rely upon actual location information through actual satellites orbiting the Earth. Likewise, specific internal room positioning devices bounce signal waves off all objects in a specific area to understand the actual parameters and structures of a room and its contents. In either way, actual location information may be provided effectively and transmitted to the camera (operator, etc.). The only possible downside of either device is the potential for delays if movement is involved and thus must be detected as soon as possible to synchronize with the actual film. In any event, combinations of either of these two together or with either of the other two potentially preferred devices may be utilized if needed, as well.

With any of these devices, additionally such transmitters/locators may be supplemented in terms of location indication capabilities with instrumentation including, without limitation, accelerometers, barometric sensors, gyroscopes, altimeters, Bluetooth devices, and the like. In other words, the ability to provide reliable and effective continuous location transmissions may be accomplished through any number of instruments. The key is the capability for locator transmissions that continue regardless, again, of the presence of any objects or persons between the subject camera and the subject markers.

The RFIDs noted above may be of any type that accords monitoring capability, including, within limitation, tags provided commercially by Tego Inc. and C.N. Clark Company, IR tags, GPS tags, and room positioning monitors may be, again, as a non-limiting example, those available from Global Sources, Inc. The important consideration, however, for these transmitter devices is the ability of these to first definitively locate their exact placement in and/or on a movie set and then transfer such information to the filming camera, operator, or other program and/or server that is set to receive such information for synchronization purposes with regard to animation insertions. Certainly, the quicker such monitors can determine specific location information and transmit the same to the camera, etc., the better. Thus, any type of device that can accord such a result, and, additionally, provides such information remotely (wirelessly, etc.) to the camera, etc., on demand, and continuously and consistently, would meet the first criteria for utilization within this inventive method. Such a device, however, must also be able to do so from a specific set location that is not only out of sight in relation to the operator, but also in terms of the camera.

To ensure that continuous and complete monitoring of set located signal transmitters during filming is accomplished, there is the further necessity, then, for the camera mounted signal receiver and transmitter to function in both capacities. The movements of the camera itself, for instance, contributes greatly to the overall view of the filmed scene; with stationary set located signal transmitters employed, then, even though such are continuously monitored by the receiver mounted on the camera, complete tracking is provided through simultaneous transmission of signals from the camera mounted device as well. Basically, since such film cameras are subjected to continuous movement (whether towards or away from a set located, and hidden, signal transmitter, for instance, not to mention camera rotation or other haphazard manipulations, again, as merely examples), a complete monitor of camera location in relation to set located transmission devices is achieved, as realized herein, through the correlated monitoring of such camera activities, as well. Thus, the continuous transmission and reception of such camera movement, etc., operations, is necessary for this overall inventive method to function properly. As alluded to above, the lack of such continuous monitoring of both set located signal transmitters and total movement of said camera (through said mounted transmission/reception devices) during actual filming on such a subject film set would require excessive takes to generate the total configuration and resolution of the overall film set for animation insertions to occur properly. The inventive method thus accords the ability to reduce drastically the number of takes needed to generate the total "picture" as filmed in order to guarantee inserted animations (such as, again, 3-D animations, as one non-limiting example) in required locations within the finished film. Software packages may be utilized for such animation insertion purposes, including, as merely non-limiting examples, 3DEqualizer, PF-Track, Maya, and the like 3D software packages well known within the film industry.

Thus, for such continuous monitoring activities, such a camera thus must be outfitted with a suitable transmitter/receiver for such remote and wireless communications. RFID and IR sensors provided on the set located devices can thus transmit around, over, and, at times, through objects for this purpose. The camera (or server, perhaps) must thus be outfitted with a proper RFID receiver and/or an IR monitor for receipt of such information from the set located devices, as well as transmitting devices themselves to monitor the overall movement of the camera during filming in relation to the set located signal transmitters. As alluded to above, the camera-mounted receiver/transmitter may be integrated within the subject camera itself to provide the desired synchronization with the recorded film for animation insertion purposes. The positioning devices may communicate such information, albeit in totally different ways compared with one another (one provides exact location in terms of longitude and latitude, while the other in terms of the actual structure, contours, and/or objects present within a room and/or on a set). Likewise, RFID, again, provides location results in any manner pre-programmed within the overall system and sends signals through a specific radio frequency to that effect. The IR, again, indicates such location information and then sends a non-visual pulse to the receiver; varying strength of signal provides specific location parameters for this purpose. Again, through any type of monitoring activity may be employed that is conducive to having hidden transmitters (from view of the filming camera, at least), and can guarantee a certain degree of reliability in terms of synchronizing camera and location indications with the camera mounted transmitter(s), too.

The inventive method thus includes the monitoring of specific locations on set for introduction/insertion of animated material (defined herein as any of computer graphics, or CGI, hand-drawn caricatures, and other types of considerations including three-dimensional effects). Such material may be provided in any manner within the subject film. The ability to do so in a seamless fashion, ostensibly just "dropping" such animated material within the target film at any of the transmitter-monitored locations therein, is one noted benefit of this overall system. The hidden placements of such monitoring and transmitting devices allows, again, for avoidance of any viewed structures of this sort that would require time-consuming "scrubbing" (or removal, as the case may be) from the film itself. As well, the continuous and constant monitoring and transmitting of location information to the camera (server, operator, etc., as needed) provides effective understanding of the exact placement of all such hidden devices to allow greater flexibility, versatility, and overall effect to the film director. There is no need, for example, for the camera operator to re-film such a scene with multiple angles, etc., of the set to obtain parallax calibrations for the filming camera in relation to any such markers. With visualized (non-hidden) markers, as in the prior art, such devices are not typically outfitted with anything providing location information, particularly since such indications are clearly seen while filming; hidden devices, clearly, are more difficult to find and thus necessitate such monitoring and transmitting of location information constantly. Again, the inventive system has overcome this multiple shot requirement since the indications provided by the monitoring and transmitting devices provide such information on demand and automatically.

Filming, itself, is a long-established practice, for both animated and live-action movies (and television shows, advertisements, and the like). Classic films, such as, for instance, "Mary Poppins" established a high level of expertise and ability in terms of combining such live-action and animation conglomerations on-screen. Three-dimensional effects have been around for many years; however, the complexities with filming and ultimately providing such entire film products of this sort have long proven time-consuming, particularly in terms of ensuring the effects are in the proper position within the final released film. CGI has opened up vast arrays of possibilities within the film milieu, as well. "Young Sherlock Holmes" provided the first glimpse of such a powerful cinematic tool way back in 1985. Nowadays, such effects are commonplace, although the ability to seamlessly introduce such results has still proven difficult, either with technology at such a high level. The need for ensure placement within a film is absolutely proper still requires the manual placement of markers, but, as of today, in the sight line of a camera, at least. The ability to remove such visual markers for such a purpose, would thus also reduce the costs involved with post-production, as noted above. And, again, since such typical markers are placed in visible locations on a film set, the transmission capabilities thereof are of significant limitations, particularly when compared with those disclosed herein. In any event, the overall system thus may include the insertion of any type of animation, as well as any combinations thereof, within a live-action film sequence (or entire film, for that matter).

A typical camera for this purpose may be found commercially, such as, without limitation, cameras from Blackmagic Pocket Cinema Camera (e.g., Blackmagic Production Camera 4K), Alexa, Alexa XT, Alexa Studio, Alexa Plus, and Sony, again as non-limiting examples. Such camera devices typically include control capabilities to optimize the cinematic result (whether required by a director or undertaken by the camera operator). Thus, once the set is properly set up for a scene, the camera begins to receive such notifications/indications from the sensors/monitors/transmitters. Upon filming, the signals continue until shut off in some manner on the set, or until the camera (or server, etc.) refuses receipt of such signals any further. The continued transmissions provides reliability to the camera-mounted receiver, operator, server, etc., at least, that the metrics of device location are reliable and correct. The camera, server, etc., thus receives these constant signals and records them for further computer-driven synchronization with the to-be-inserted animation.

The overall system may thus be utilized for any type of transmitter location information reception. Although noted herein as suitable for a film set, in actuality, due to the nature of the transmitters themselves, most of the noted monitoring methods would function properly for any film location, whether enclosed or open (the room location placement alternative, however, would be rather difficult, though not impossible, to utilize for such a varied purpose). In any event, any desired and effective utilization of the placement of such electronic signal transmitters for location communication purposes would be well within the purview of the ordinarily skilled artisan, particularly with any receiver held by and/or within a camera, a server, or the operator her- or him-self.

BRIEF DESCRIPTION OF THE DRAWINGS

FIG. 4 provides an aerial view of a receiver-mounted film camera.

FIG. 5 provides a side perspective view of the camera of FIG. 4.

FIG. 6 provides a side view of the camera of FIG. 4.

FIG. 7 provides a front view of the camera of FIG. 4.

FIG. 8 is an aerial view of an on-set placement of multiple location markers sending transmissions to a camera-mounted receiver.

FIG. 9 is a side perspective view of the setup of FIG. 8.

FIG. 10 is a front perspective view of the setup of FIG. 8.

FIG. 11 is a side view of the setup of FIG. 8.

DETAILED DESCRIPTION OF THE PREFERRED EMBODIMENTS AND THE DRAWING

Without any intention of limiting the breadth and scope of the overall inventive method, the following descriptions of the accompanying drawings provide one potentially preferred embodiment of the utilization of the aforementioned inventive live-action video recording process for animation insertions.

Figure 1:
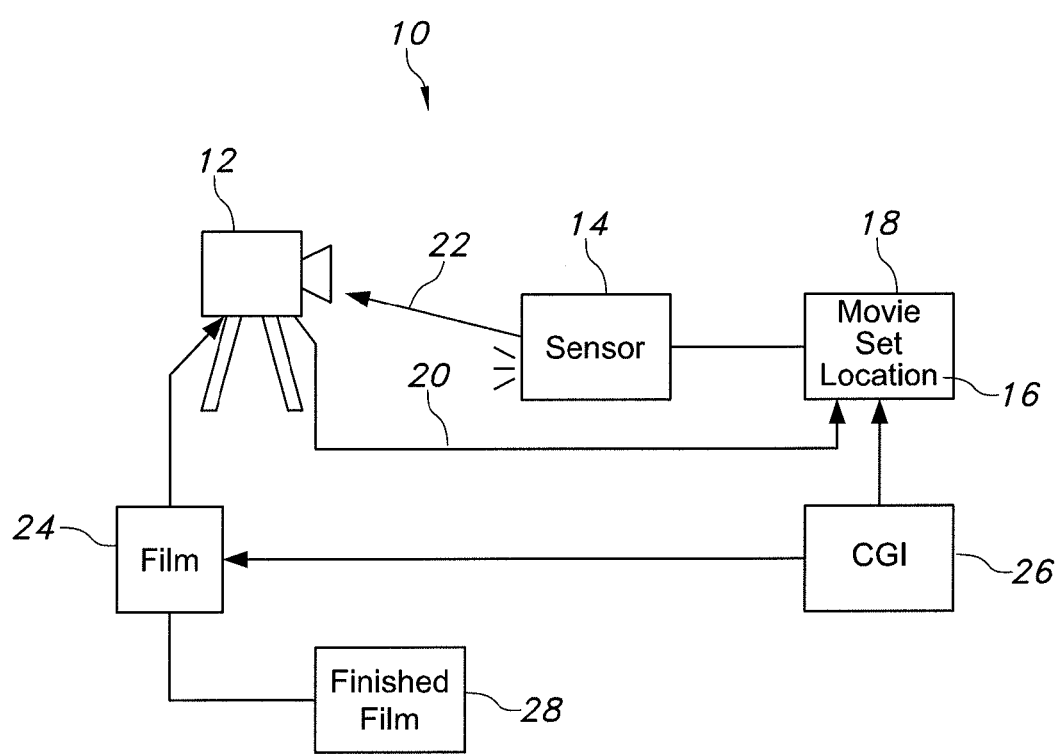
FIG. 1 is a flow chart of one possible embodiment of a potentially preferred animation insertion film method utilizing hidden signal transmission markers for location indication purposes.

FIG. 1 shows a flow chart of the overall system 10. A first step involves initiating the camera 12 to receive information 22 from a sensor 14 placed in a hidden location 16 on a live-action movie set 18. With the sensor (here an RFID, as one non-limiting example) 14 placed 16 and operating, the operator films 20 and records a scene at the film set. During filming, again, the camera receives sensor information 22 pertaining at least to actual location on the live-action set (112 of FIG. 2). Then, this sensor information 22 is then synchronized with the film 24 itself and CGI animation (as one non-limiting example) is then introduced 26 within the area indicated by the sensor(s). The finished film 28 thus includes the CGI effect as desired by the director.

Figure 2:
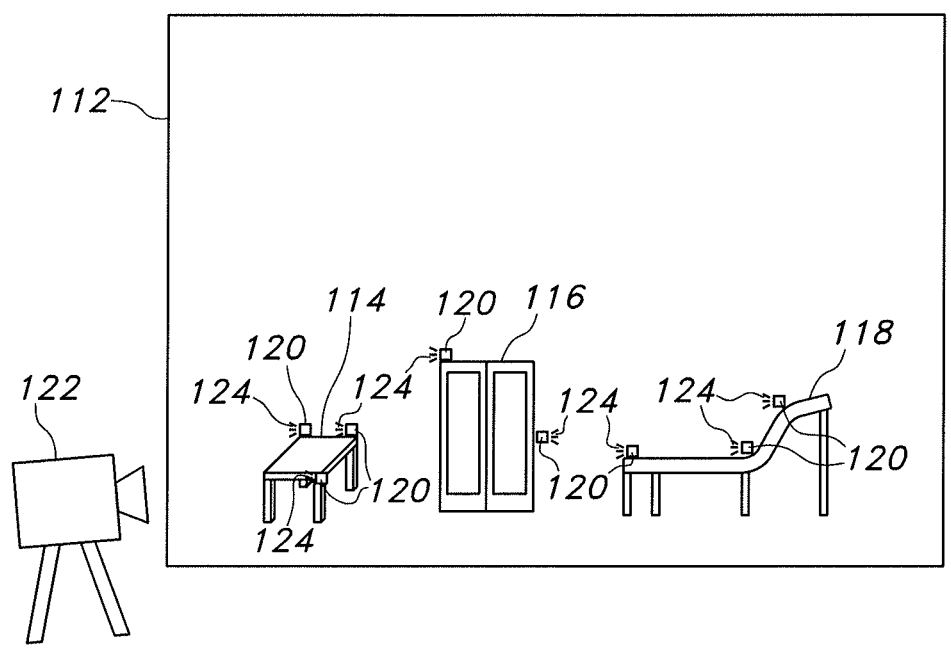
FIG. 2 is a perspective view of a film set including hidden signal transmission markers for future animation insertion purposes.

FIG. 2 thus shows a typical film set 112 including a number of objects 114, 116, 118. On the set 112 are placed a plurality of sensors 120 provided in an array as an indication for CGI (or other like animation) insertion. The sensors 120 are hidden behind the objects 114, 116, 118 at specific areas that will be covered with expected CGI (or other like animation) at post-production (not illustrated). Once in place, the markers (sensors) 120 are then linked with the camera 122 and are locked in to send transmission continuously to the receiver camera 122 continuously or at least with rhythmic pulses set at desired time periods (such as every second, millisecond, or less, as merely examples). The camera 122 thus films the objects 114, 116, 118, including the hidden sensors 120 while the sensors 120 constantly update their location information 124 to the camera 122 (and possibly a server, not illustrated, and an operator 124). The camera 122 thus undergoes continuous monitoring and recording of its own movements during filming through continued transmission of location signals present thereon (which allow, as noted above, for continued monitoring of the hidden sensors 120 on the film set as well as the activities/manipulations of the camera 122 during filming, as well. As above, these hidden monitors 120 provide the necessary location information 124 for animation insertion purposes. In this manner, a single shot of the set 124 is all that is needed to allow for suitable parallax views and alignment between set 124 and CGI effect. Coupled with the hidden aspect thereof (at least from camera view, at least), there is likewise no need to remove any unsightly markers from the film surface during post-production, either.

Figure 3:
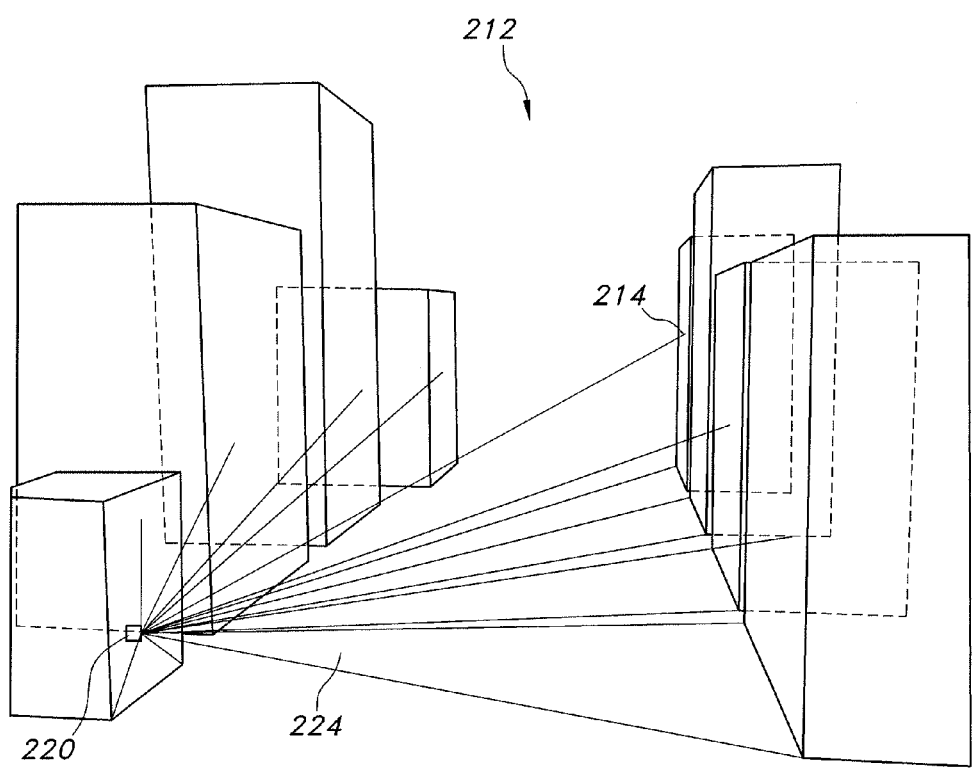
FIG. 3 shows a receiver assembly receiving multiple simultaneously transmissions from multiple locators.

FIG. 3 provides a depiction of a receiver 220 that is continuously sent multiple signals 224 from multiple mounted sensors (locators/markers) 214. Such sensors 214 are noticeably placed in different locations, but the receiver 220 is configured and formatted to continuously accept such signals 224 pertaining to the multiple sensors 214 locations in order to provide an uninterrupted "picture" of the actual sensor locations 214.

FIGS. 4-7 show a standard camera 310 in relation to this invention that includes a mounted and integrated receiver 316 placed above and behind the camera aperture/lens component 312 and above and in front of the camera body 314. This receiver 316 configuration permits unabated filming of a subject (such as objects 112, 114, 116 in FIG. 1) while allowing, simultaneously, for reception of signals from locators (such as 120 in FIG. 1) to relate to the actual point of view of the camera itself during filming.

In action, then, FIGS. 8-11 show the same camera 310 with mounted receiver 316 filming on a set with the sensors 320 placed under the corners of a table 324 and thus out of the line of vision of the camera 310 during filming. The sensors 320, linked to the receiver 316 which is itself integrated within the camera 310, send continuous signals 322 of their actual locations. With the sensors 320 configured as described herein (GPS, IR, RFID, etc., bases, with other instrumentation, such as accelerometers, altimeters, and the like, potentially added for effect, as well) the continuous transmission of such location signals 322 to the receiver 316, even if an object or person moves between the camera 310 and the table 324, allows for instantaneous recordation and synchronization of film and desired areas for animation inserts. Thus, this method permits such an undertaking a single time without complete positioning recorded for overall effect without any need for scrubbing or removing on-set and thus visible location sensors from the resultant film, let alone the necessity for further parallax views to be recorded for proper animation insertion placement. The inventive method allows for reliable and effective first-time and real-time recordation of sensor locations, thus avoiding re-shoots, picture scrubbing, and other costly and time-consuming procedures.

Such accompanying drawings thus show the base flow charts of the system implemented through the utilization of the inventive hidden marker technology for constant and consistent location measurement information for animation insertion thereafter. Thus, the preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What is claimed is:

1. A method of filming a live-action video scene on a film set with a recording camera, said recording camera including a signal transmitter and receiver mounted thereon, wherein such filming is for a film including inserted animation combined therewith said live-action, said method including:
    placing at least one signal transmission device as a marker on said film set for said inserted animation, wherein said signal transmission device is selected from the group consisting of an RFID device, an infrared device, a global positioning system device, an internal room positioning device, and any combinations thereof, and wherein said placement of said at least one device is provided at a location on said film set that is hidden from camera view for the entirety of filming said scene;
    activating said at least one device to continuously transmit information of its specific location on said film set to said camera during said filming of said scene; and
    activating said signal transmitter and receiver attached to said recording camera to continuously receive said transmitted information from said at least one set located signal transmission device while filming occurs and also activating said camera mounted signal transmitter and receiver to continuously transmit signals of the activity and movement of said camera to said at least one set located signal transmission device, thereby utilizing said specific location information from said at least one device and said camera mounted signal transmitter and receiver to provide real-time capability for insertion of said animation within said film in relation to such specific monitored transmission signals and camera activity and movement.

2. The method of claim 1 wherein said filming of said scene requires only a single film shot without any need for alignment or other type of hidden device location actions to permit said animation insertion to occur.

3. The method of claim 2 wherein said at least one signal transmission device sends communication to said camera without the need for direct viewing thereof.

4. The method of claim 3 wherein said device is an RFID device.

5. The method of claim 4 wherein said inserted animation is selected from the group consisting of hand-drawn animation, computer graphic animation, three-dimensional animation, and any combinations thereof.

6. The method of claim 3 wherein said inserted animation is selected from the group consisting of hand-drawn animation, computer graphic animation, three-dimensional animation, and any combinations thereof.

7. The method of claim 2 wherein said inserted animation is selected from the group consisting of hand-drawn animation, computer graphic animation, three-dimensional animation, and any combinations thereof.

8. The method of claim 1 wherein said at least one signal transmission device sends communication to said camera without the need for direct viewing thereof.

9. The method of claim 8 wherein said inserted animation is selected from the group consisting of hand-drawn animation, computer graphic animation, three-dimensional animation, and any combinations thereof.

10. The method of claim 1 wherein said device is an RFID device.

11. The method of claim 10 wherein said inserted animation is selected from the group consisting of hand-drawn animation, computer graphic animation, three-dimensional animation, and any combinations thereof.

12. The method of claim 1 wherein said inserted animation is selected from the group consisting of hand-drawn animation, computer graphic animation, three-dimensional animation, and any combinations thereof.

\* \* \* \* \*